United States Patent
Hache et al.

(10) Patent No.: US 10,207,825 B2
(45) Date of Patent: Feb. 19, 2019

(54) TELECOMMUNICATIONS SATELLITE ARCHITECTURE

(71) Applicants: AIRBUS DEFENCE AND SPACE SAS, Toulouse (FR); THALES, Neuilly sur Seine (FR); CENTRE NATIONAL D'ETUDES SPATIALES CNES, Paris (FR)

(72) Inventors: Raphaël Hache, Pegomas (FR); Bruno Trancart, Portet sur Garonne (FR); Andrew Walker, Pechbusque (FR)

(73) Assignees: AIRBUS DEFENCE AND SPACE SAS, Toulouse (FR); THALES, Neuilly sur Seine (FR); CENTRE NATIONAL D'ETUDES SPATIALES CNES, Paris (FR)

( * ) Notice: Subject to any disclaimer, the term of this patent is extended or adjusted under 35 U.S.C. 154(b) by 356 days.

(21) Appl. No.: 15/108,780

(22) PCT Filed: Dec. 24, 2014

(86) PCT No.: PCT/EP2014/079314
§ 371 (c)(1),
(2) Date: Jun. 28, 2016

(87) PCT Pub. No.: WO2015/101581
PCT Pub. Date: Jul. 9, 2015

(65) Prior Publication Data
US 2016/0325856 A1    Nov. 10, 2016

(30) Foreign Application Priority Data

Dec. 30, 2013 (FR) ..................... 13 63690

(51) Int. Cl.
*B64G 1/50* (2006.01)
*B64G 1/10* (2006.01)
(Continued)

(52) U.S. Cl.
CPC ........... *B64G 1/503* (2013.01); *B64G 1/1007* (2013.01); *B64G 1/222* (2013.01); *B64G 1/506* (2013.01); *B64G 1/66* (2013.01)

(58) Field of Classification Search
CPC ........... B64G 1/503; B64G 1/506; B64G 1/50
See application file for complete search history.

(56) References Cited

U.S. PATENT DOCUMENTS

| 4,162,701 A * | 7/1979 | Ollendorf | B64G 1/50 165/104.11 |
| 5,823,477 A | 10/1998 | York | |

(Continued)

FOREIGN PATENT DOCUMENTS

| EP | 0 647 559 A1 | 4/1995 |
| EP | 0 891 926 A1 | 1/1999 |
| WO | 2010/111364 A1 | 9/2010 |

*Primary Examiner* — Brian M O'Hara
(74) *Attorney, Agent, or Firm* — IM IP Law; C. Andrew Im; Chai Im

(57) ABSTRACT

A telecommunications satellite stabilized on three axes includes a set of dissipative equipment constituting a payload of the satellite. The satellite includes support data transmission antennas and is substantially parallelepipedal in shape with the panels forming two opposite faces, east and west faces. The panels form two additional opposite faces, north and south faces, and include radiator surfaces on their external faces. The radiator surfaces are configured to cool the electronic equipment of the satellite. The equipment installed on the north and south panels dissipate thermal power corresponding to less than 25% of the total dissipated power.

16 Claims, 5 Drawing Sheets

(51) Int. Cl.
*B64G 1/22* (2006.01)
*B64G 1/66* (2006.01)

(56) References Cited

U.S. PATENT DOCUMENTS

| | | | |
|---|---|---|---|
| 7,967,256 B2 * | 6/2011 | Wong | B64G 1/425 244/171.8 |
| 2002/0139512 A1 * | 10/2002 | Low | B64G 1/503 165/41 |
| 2002/0153128 A1 | 10/2002 | Low et al. | |
| 2004/0164205 A1 | 8/2004 | Kellberg | |

* cited by examiner

Ku Band
2m guide

Ku Band
4m guide

TELECOMMUNICATIONS SATELLITE ARCHITECTURE

RELATED APPLICATIONS

This application is a § 371 application from PCT/EP2014/079314 filed Dec. 24, 2014, which claims priority from French Patent Application No. 13 63690 filed Dec. 30, 2013, each of which is incorporated herein by reference in its entirety.

FIELD OF THE INVENTION

The present invention relates to the field of the architectures of telecommunications satellites stabilized on three axes.

BACKGROUND OF THE INVENTION

To cope with the ever-increasing volume of telecommunications in the world, the telecommunications satellites are becoming increasingly powerful. Their electronic payload (traveling wave tubes in particular) thus gives off a considerable thermal power, approximately 60% of the electrical power of the satellite, that is to say, routinely of the order of several kW, and the cooling of this payload becomes increasingly difficult to perform. This problem is exacerbated by another phenomenon. In effect, the number of free positions in geostationary orbit is limited which makes it necessary to design satellites that are evermore powerful to be stationed in this orbit, to maximize the use thereof. Various techniques have been considered to solve this power/cooling problem for high-power satellites.

The progressive raising of the frequency bands used to higher frequencies further increases this problem, because of the concomitant losses in the waveguides installed between the payload and the transmission antennas, which makes it necessary to further increase the electrical power of the payload.

The aim of the present invention is to propose a solution to all or some of these problems.

SUMMARY OF THE INVENTION

To this end, under a first aspect, the invention targets a telecommunications satellite, of the type stabilized on three axes, notably but not exclusively intended to be stationed in geostationary orbit, said satellite comprising a telecommunications payload made up of a set of dissipative equipment, said satellite being of substantially parallelepipedal form with the panels forming two opposing faces, termed east and west, supporting data transmission antennas, and the panels forming two other opposing faces, termed north and south, comprising, on their outer face, radiator surfaces intended for the cooling of the electronic equipment of the satellite.

The payload equipment notably comprises active RF elements such as RF power amplifiers (ATOP and SSPA), their electrical power supplies (EPC), the pre-amplifiers and linearizer (CAMP), the input multiplexers (IMUX), passive elements such as OMUX, switches and waveguides and digital electronics (payload processors).

The satellite also comprises other equipment for the platform, ensuring the support functions (electrical power supply, communication with the ground, attitude and orbit control, etc.). The invention relates to the layout of the payload equipment and not the platform equipment. A person skilled in the art will readily draw the distinction between the platform equipment and the payload equipment.

In a first aspect of the invention, the satellite is such that the payload equipment installed on the north and south panels dissipates a thermal power corresponding to less than 25% of the total dissipated power.

A second aspect of the invention is that the power electronic equipment possibly present on the north and south walls has a dissipation corresponding to less than 25% of the power dissipated by all the electronic equipment of the payload.

Power electronic equipment should be understood to mean the RF power amplifiers (TWTA or SSPA) and their power supplies (EPC) present in the payload of the telecommunications satellite.

In this way, the length of the waveguides to be installed between the power electronic equipment and the feeds of the antennas is significantly reduced, the power electronic equipment being able to be disposed in the immediate vicinity of the feeds.

This is particularly advantageous in the case of high frequency bands, typically Ka, Q, V, for which the losses in these waveguides become considerable over a length of a few meters. These losses make it necessary to further increase the power of the equipment to obtain an adequate transmission power, which, as has been seen, increases the thermal control problem.

In the prior art, the only solution considered was to install the strongly dissipative equipment on the north and south panels, in direct contact with these cooling faces, so as to optimise the direct thermal control of the power electronic equipment.

In this novel architecture, on the contrary, priority is given to the efficiency of the payload with respect to the thermal control, and, paradoxically, by reducing the length of the waveguides between the payload and the transmission antennas, the thermal power lost in these waveguides is reduced, which simplifies the overall thermal control for high frequency bands.

The invention makes it possible to reduce the thermal dissipation and the electrical consumption, while maintaining the same level of power at the transmission antennas.

Another advantage with this configuration is that distribution of heat between the north and south panels occurs naturally, which helps to improve the cooling of the satellite.

According to the first aspect of the invention, more particularly, less than 10% of the total dissipated power is provided by the equipment installed on the north and south panels.

In an even more particular embodiment, no dissipative equipment is installed on the north and south faces. This arrangement significantly simplifies the dismantling of the north and south faces.

In a particular embodiment, the equipment installed on the east and west panels dissipates a thermal power corresponding to more than 75% of the total dissipated power.

More particularly, the equipment installed on the east and west panels dissipates a thermal power corresponding to more than 90% of the total dissipated power.

In a particular embodiment, more than 75%, and preferentially more than 90%, of the total dissipated power is dissipated inside the satellite. Inside the satellite should be understood to mean in the space between the north, south and east, west walls.

According to the second aspect of the invention, more particularly, less than 10% of the power dissipated from the power electronic equipment is provided by the power electronic equipment installed on the north and south panels.

In an even more particular embodiment, no power electronic equipment is installed on the north and south faces.

The following embodiments relate to the two aspects of the invention.

In a particular embodiment, the satellite is such that at least some of the power electronic equipment is installed on the east and west panels, the north and south panels being devoted mainly or exclusively to the cooling of the satellite.

In a more particular embodiment, more than half of the surface of the east and west faces is dedicated to the installation of power electronic equipment.

In a particular embodiment, power electronic equipment is installed on at least one face, and, in a more particular embodiment, on the two faces, of at least one of the east and west panels.

In effect, mounting electronic equipment on the panels not dedicated to cooling makes it possible to install equipment on the two faces of these panels, which doubles the surface area that can be used for mounting the payload. In the prior art, the surface area needed to install the payload, and the surface area necessary to radiate the heat produced into space were substantially equivalent.

In a particular embodiment, the satellite comprises at least one internal panel parallel to the east and west panels, bearing power electronic equipment on at least one face. The panel can bear power electronic equipment on its two faces.

The arrangement of the panels bearing the power electronic equipment at right angles to the radiative north and south panels makes it possible to consider arranging several such electronic panels in parallel, these electronic panels being substantially at right angles to the radiative panels. An "electronic circuit board" arrangement is thus achieved, similar to that of a computer, the number of boards being able to be arbitrarily chosen according to the specifications of the mission of the satellite. These boards, being linked to the radiative panels by their north and south edges, are linked to these panels by cooling devices, for example of fluid loop type.

In a particular embodiment, the satellite comprises at least one heat transfer device of fluid loop type whose condensers are disposed on at least one of the north and south panels, or of heat pipe type.

In this case, the evaporators can be disposed directly in contact with the power electronic equipment, on the east and west panels.

In a particular embodiment, at least one of the north and south panels is articulated around one of its edges in common with the east and west panels, the fluid loops or the heat pipes comprising flexible zones in the vicinity of said articulation.

In another embodiment, at least one of the north or south panels is composed of two half-panels, each articulated about their edge in common with the east or west panel.

This arrangement allows access to the core of the satellite very late in the process of integration thereof before launch, which was not possible in the prior art.

In a particular embodiment, the satellite comprises deployable radiative panels. In this case, these deployable radiative panels are linked by heat transfer devices, for example of fluid loop type, to the equipment installed on the east and west panels.

The configuration chosen in effect means placing heat transfer devices between the east and west panels, bearing the dissipative equipment, and the radiative north and south panels. There is therefore no additional complexity involved in prolonging the tubes of the fluid loops to link them to the deployable radiative panels.

The invention entails the separation of the zones bearing the dissipative equipment, and the zones that radiate to space, unlike the prior art, in which these zones were identical.

This separation makes it possible to dimension these two zones independently.

It is for example possible to consider, in the case of complex payloads comprising many items with relatively low dissipation, using many east-west "boards" bearing electronic equipment, and using the north and south faces for the cooling.

On the other hand, it is also possible, in the case of a limited quantity of electronic equipment of very high power, to use only the outer faces of the east and west panels for the mounting of the electronic equipment, and to add deployable radiative panels to the north and south panels to ensure the cooling.

The invention also targets an integration method for a satellite as explained above, the method comprising a step of opening one of the north or south panels to access the satellite payload.

DESCRIPTION OF THE FIGURES

The features and advantages of the invention will be better appreciated from the following description, a description which explains the features of the invention through a nonlimiting exemplary application.

The description is based on the attached figures which represent.

DETAILED DESCRIPTION OF AN EMBODIMENT OF THE INVENTION

Figures 1A, 1B:
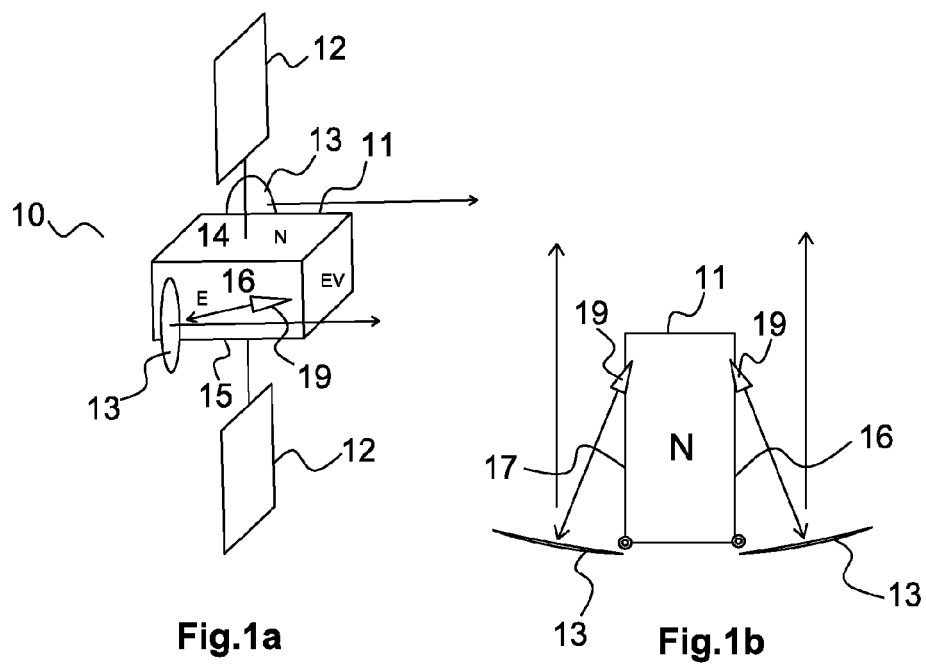
FIGS. 1a and 1b: a schematic representation of a geostationary satellite stabilized on 3 axes.

The present invention is intended to be used on a satellite of the type stabilized on 3 axes, intended, in the present example, to be stationed in geostationary orbit. It concerns, for example, but in a nonlimiting manner, a telecommunications satellite. As can be seen in FIGS. 1a and 1b, in a purely illustrative and nonlimiting example, it is assumed here that it is a satellite 10 comprising a body 11 of substantially parallelepipedal form, in which the centers of the faces define axes X, Y, Z.

Figure 2:
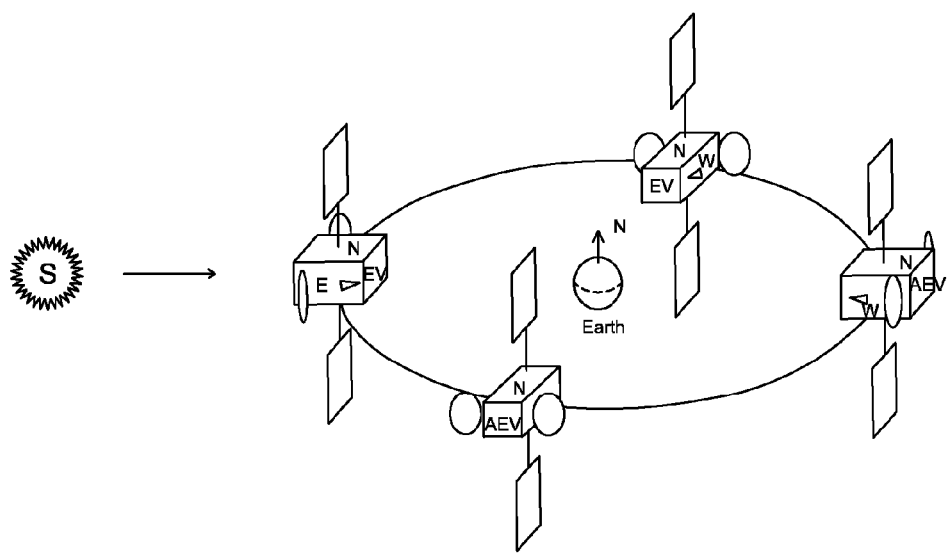
FIG. 2: a representation of the different attitudes of the satellite in its orbit.

When the satellite 10 is stationed in its orbit (see FIG. 2), its faces are oriented such that an axis Y, termed north-south, is parallel to the axis of rotation of the Earth, an axis X, termed east-west, is parallel to the axis of displacement of the satellite in its orbit, and an axis Z, termed Earth-antiEarth, is at right angles to the other two.

The satellite GEO 10 always shows the same face to the Earth, and its north 14 and south 15 faces are the least illuminated by the sun, in the orbit of the satellite around the Earth. In the present example, the satellite 10 considered comprises solar panels 12 attached to these north 14 and south 15 faces, because, that way, these solar panels 12 remain permanently out of the shadow generated by the satellite itself. These north 14 and south 15 faces also usually include radiators (not illustrated in the figure), thus exploiting their low exposure to the sun.

The satellite 10 also comprises reflectors 13, arranged on the east 16 and west 17 faces, and thus always facing the Earth in the orbit of the satellite 10. These reflectors 13 reflect to the Earth the signals transmitted by feeds in the form of horns 19, the signals to be transmitted being generated by a set of electronic equipment, notably traveling wave tubes.

This general architecture of the satellite 10 is well known to those skilled in the art, and as such is a departure from the framework of the invention. It is not therefore described more herein.

Figure 3:
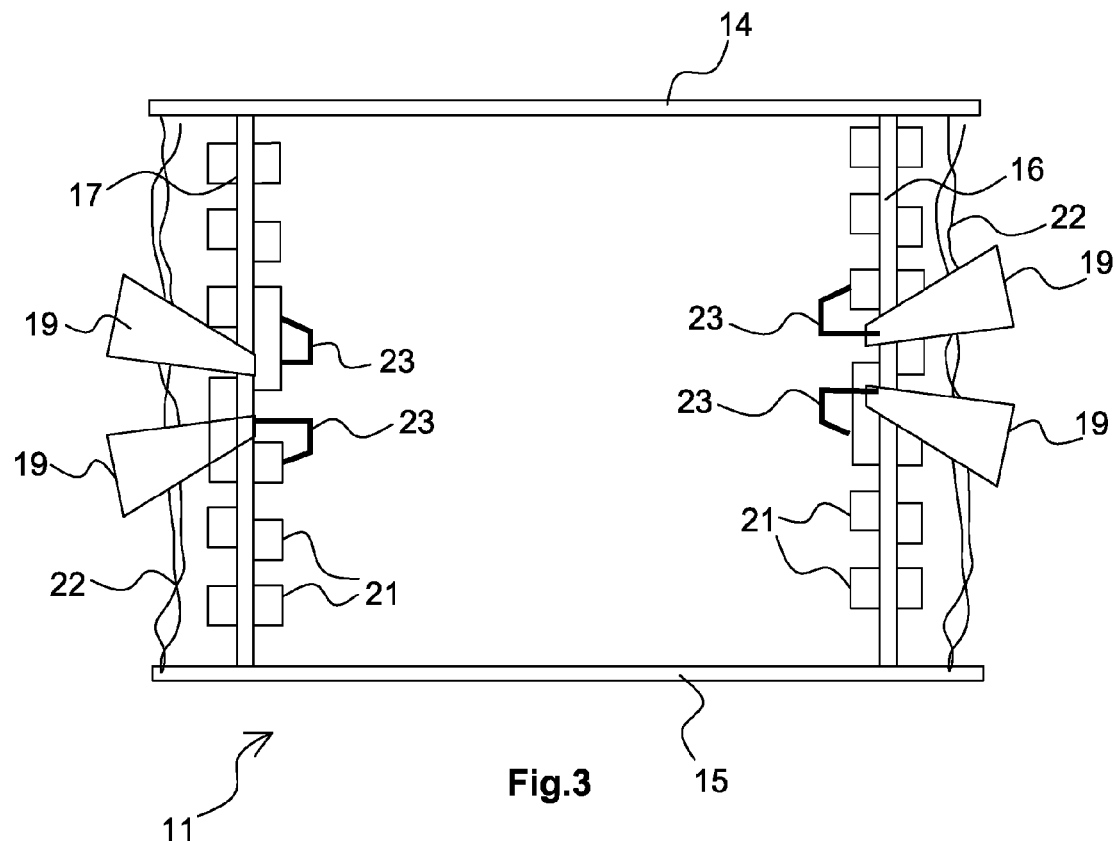
FIG. 3: a schematic representation of the arrangement of the electronic equipment in a satellite seen from above, according to an embodiment of the invention.

FIG. 3 then illustrates, schematically, a case of implementation of the invention. This figure is a plan view (along the Earth-antiEarth axis), with the panels closing the Earth and antiEarth faces assumed removed. The panels forming the north 14 and south 15 faces of the satellite 10 will be recognized there at the top and bottom of FIG. 3, as will the panels forming the east 16 and west 17 faces of the satellite on the left and right sides of FIG. 3. The reflectors 13 and the horns 19, installed on the east 16 and west 17 faces of the body 12 of the satellite 10 will also be recognized therein.

As can be seen, in the implementation given here by way of example, the power electronic equipment 21 is installed on the east and west panels, and on both sides of these panels 16, 17, that is to say both inside the rectangular parallelepiped forming the body 11 of the satellite 10, and outside the latter. The electronic equipment 21 installed outside the body of the satellite 10 is protected from radiation by a protective cover 22, for example a multilayer insulation, of a type known per se. The horns 19 are linked to the power electronic equipment 21 by waveguides 23, of short length because of the proximity of the electronic equipment 22 and of these horns 19.

The methods used to mount the electronic equipment 22 on the east 16 and west 17 panels are known per se.

Figure 4:
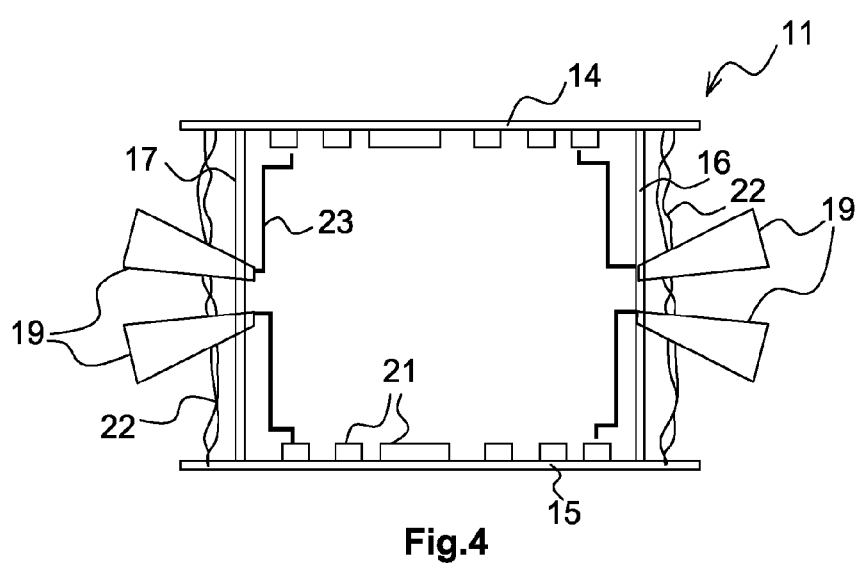
FIG. 4: a similar representation, corresponding to the prior art.

As can be seen by way of comparison in FIG. 4, in the prior art, the electronic equipment 22 was installed on the north 14 and south 15 panels, and linked to the horns 19 by waveguides 23 significantly longer than in the implementation of the invention, as illustrated by FIG. 3. Furthermore, this electronic equipment 22 was installed only on the inner face of the north 14 and south 15 panels, the outer face being used to act as radiator to space.

Figure 5:
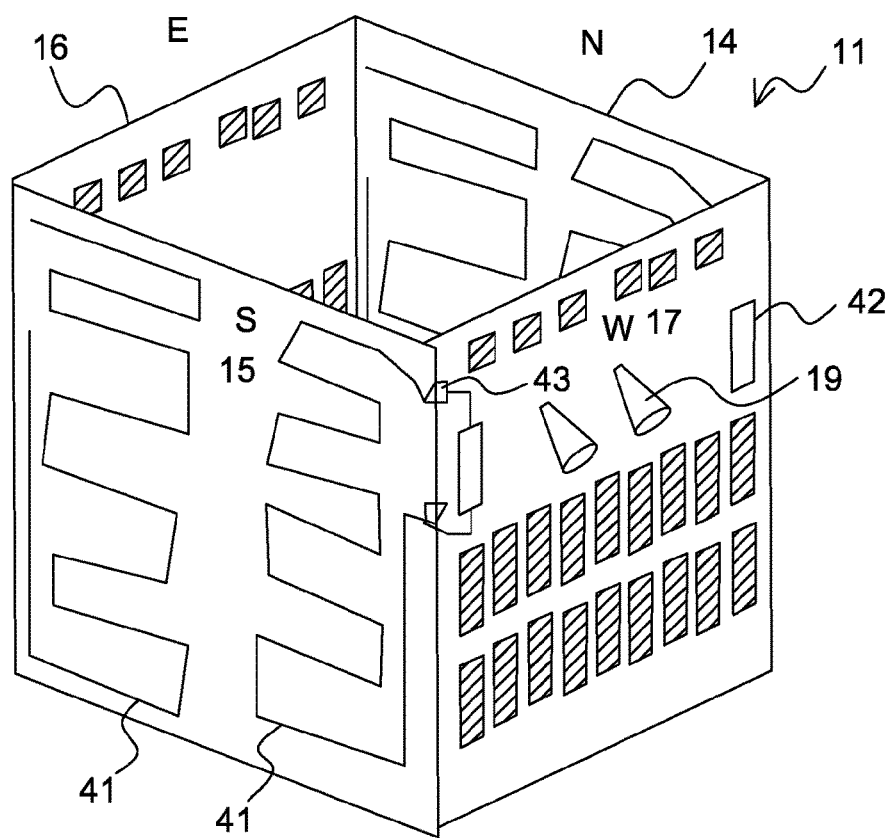
FIG. 5: a perspective schematic view of the body of the satellite, illustrating the layout of the satellite cooling loops.

FIG. 5 then shows, in perspective view, the north, south, east and west panels of the body 12 of the satellite 10. Recognizable in this figure are the horns 19, the electronic equipment 22 installed on the two faces of the east and west panels. The figure is given in the nonlimiting case of a cooling of the electronic equipment 22 by cooler of fluid loop type. The north and south panels here comprise networks 41 of condensation tubes, which meander on the outer faces of these north and south panels, so as to ensure a good thermal coupling with these faces. For their part, the east and west panels bear evaporators 42, arranged on the panels in the vicinity of the electronic equipment 22, or directly in contact therewith.

It should be noted that other cooling systems known to those skilled in the art can also be used, such as, for example, by using a cooling device with heat pipe instead of a fluid loop.

The tubes linking the evaporators 42 to the network of condensers 41 here comprise flexible zones 43, in the vicinity of the joints between the east and west panels, on the one hand, and the north and south panels, on the other hand.

The north and south panels are in fact here articulated rotationally about an Earth-antiEarth axis, along a line of contact between these north and south panels and the east and west panels. In the present nonlimiting example, each north and south panel is formed by two half-panels, each articulated about an east or west panel edge. In this way, the north (and/or south) half-panels can be opened in the manner of a door to give access to the interior of the body 12 of the satellite 10, before its launch.

In a first variant implementation, the assembly of the north (or south) panel pivots, which assumes that the fluid loops can be dismantled on one of the sides.

In a second variant, the panel opens into two, which assumes that there is no fluid loop circuit going from one half-panel to the other, and in this case access is achieved without dismantling loops.

In both cases, the major benefit is the access to the equipment without affecting the electrical and, above all, RF (rigid waveguide) connections.

Figure 6:
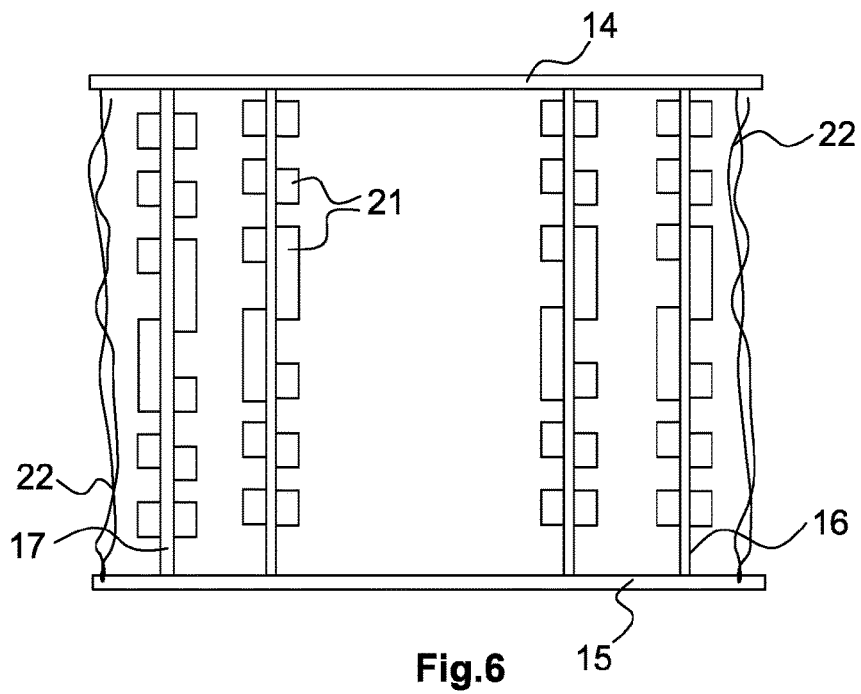
FIG. 6: a schematic representation of the arrangement of the electronic equipment in a satellite seen from above, in the case of a variant embodiment comprising several equipment-bearing parallel panels.
Figure 7:
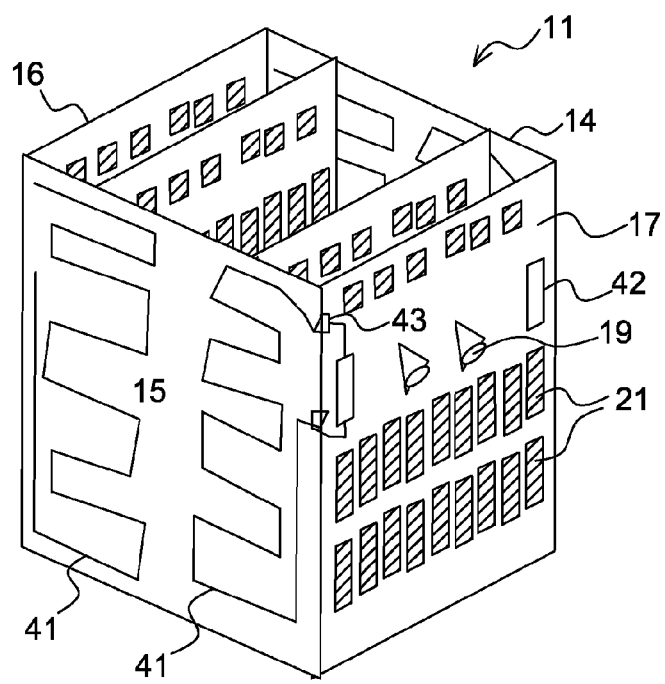
FIG. 7: a perspective schematic view of the body of the satellite, in the case of the same variant.

In a variant embodiment illustrated by FIGS. 6 and 7, the satellite comprises intermediate panels 51, parallel to the east and west panels. Each of these intermediate panels supports electronic equipment 22 on one or its two faces, depending on the needs of the satellite mission and the space available within the body of the satellite 10. In the present exemplary embodiment, each of these intermediate panels 51 also comprises at least one evaporator, linked to a network 41 of condensation tubes on the north and/or south panels. Illustrated here are two intermediate panels in the present example, but the number of these panels can vary according to the mission requirements. Similarly, their relative distances are dependent on the requirements of the equipment borne and the internal architecture of the satellite 10.

The methods by which the panels are attached together are of a type known to those skilled in the art and are a departure from the framework of the present invention.

Figure 8:
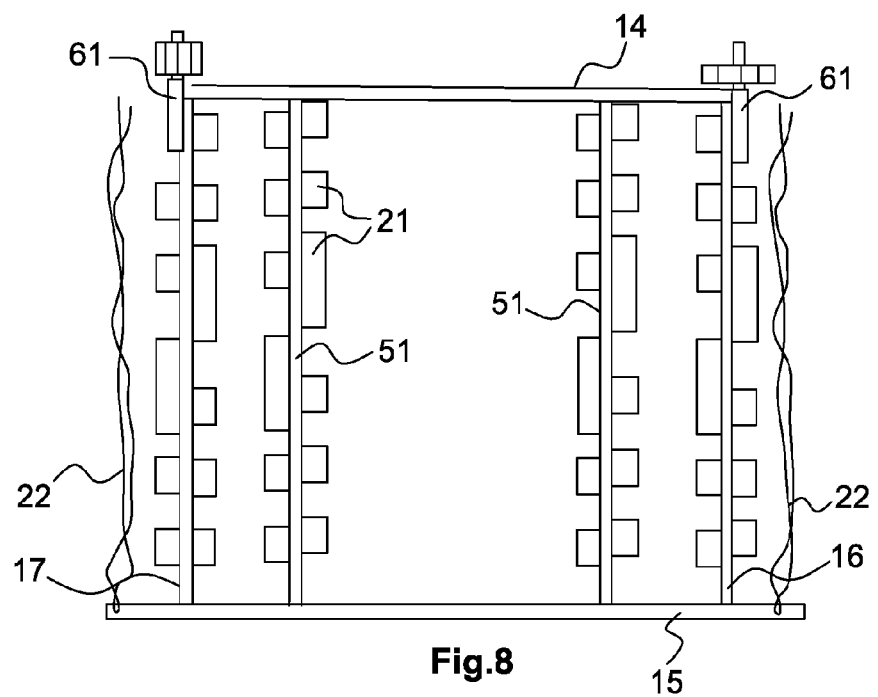
FIG. 8: a plan view illustrating the arrangement of travelling wave tube radiators, in a variant embodiment of the invention.

FIG. 8 shows a detail of layout of traveling wave tube radiators in the case of installation of electronic equipment 22 on the east and west panels. As can be seen in this figure, radiators of traveling wave tubes 61 can be installed along edges linking the lateral panels, in such a way that the traveling wave tubes are located on the east or west faces, the radiators, for their part, facing north or south.

Figure 9A:
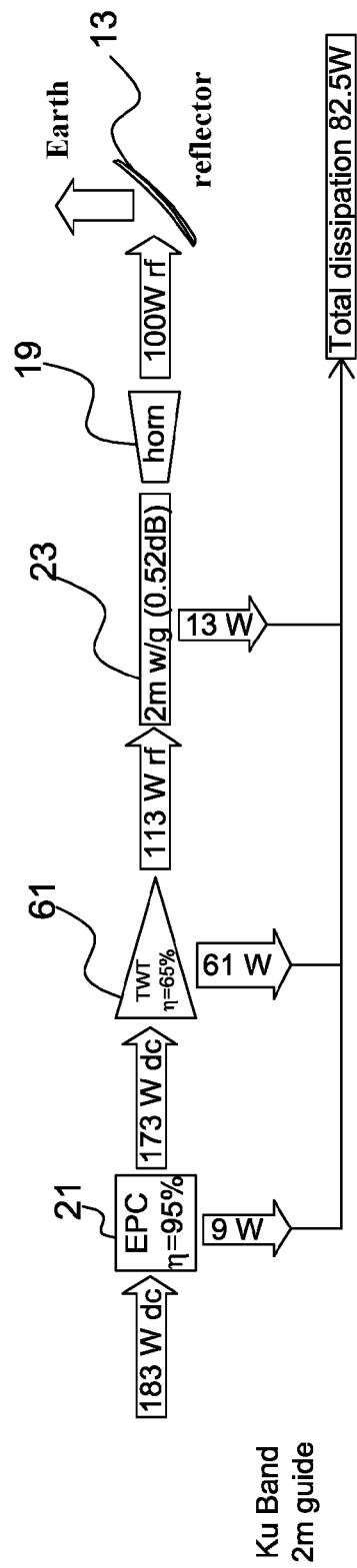
FIGS. 9a and 9b: diagrams summarizing the power losses in Ku band according to whether the waveguides have a length of 2 m or of 4 m.
Figure 9B:
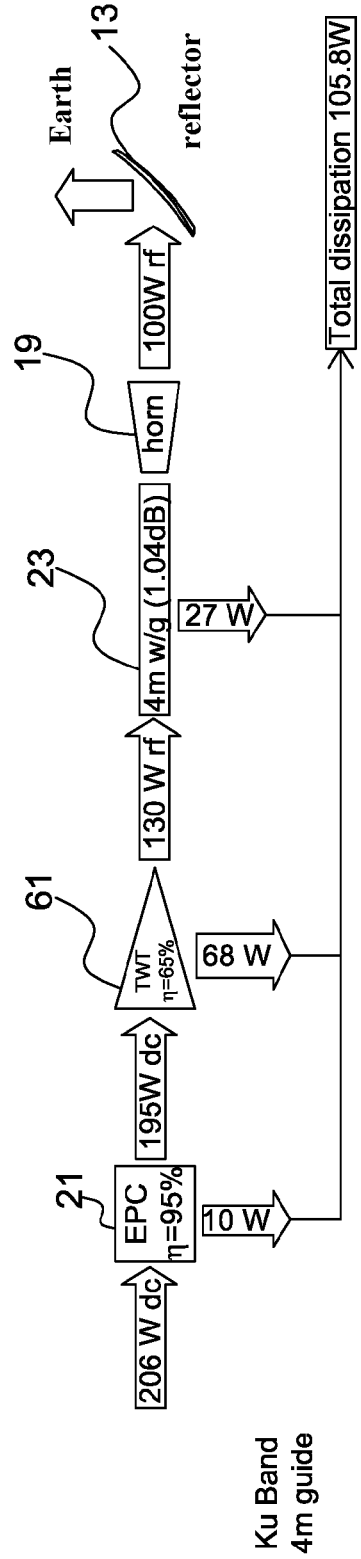

FIGS. 9a and 9b highlight the dissipated powers, in the case of waveguides 2 meters long (FIG. 9a) and 4 meters long (FIG. 9b). The numeric data are cited here by way of simple illustrative example, in the case of a satellite operating in Ku band.

As can be seen in FIG. 9a, in the case of a waveguide 2 m long, for a power transmitted to the Earth of 100 watts, the losses are 82 watts, with a total consumed power of 182 watts. On the other hand, in the case of a waveguide 4 meters long, the losses are 106 watts, for a same transmitted power of 100 watts. The gain in total consumed power is therefore 10%.

The invention claimed is:

1. A telecommunications satellite stabilized on three axes, comprising:
a set of dissipative equipment constituting a satellite payload, the satellite is substantially parallelepipedal in form with east and west panels forming two opposing faces, the satellite comprises supporting data transmission antennas, and north and south panels forming two other opposing faces, the north and south panels comprising, on their outer faces, radiator surfaces configured to cool an electronic equipment of the satellite; and
wherein the dissipative equipment installed on the north and south panels is configured to dissipate a thermal power corresponding to less than 25% of a total dissipated power of the electronic equipment of the payload.

2. The satellite as claimed in claim 1, wherein the dissipative equipment installed on the north and south panels is further configured to dissipate the thermal power corresponding to less than 10% of the total dissipated power.

3. The satellite as claimed in claim 1, wherein the dissipative equipment installed on the north and south panels is further configured to dissipate no thermal power.

4. The satellite as claimed in claim 1, wherein the dissipative equipment installed on the east and west panels is configured to dissipate the thermal power corresponding to more than 75% of the total dissipated power.

5. The satellite as claimed in claim 4, wherein the dissipative equipment installed on the east and west panels is further configured to dissipate the thermal power corresponding to more than 90% of the total dissipated power.

6. The satellite as claimed in claim 1, wherein inside the satellite, a space between the north, south east and west panels is configured to dissipate more than 75% of the total dissipated power.

7. The satellite as claimed in claim 6, wherein the space is configured to dissipate more than 90% of the total dissipated power.

8. The satellite as claimed in claim 1, wherein at least one power electronic equipment is installed on the east and west panels.

9. The satellite as claimed in claim 8, wherein said power electronic equipment is installed on the face of at least one of the east and west panels.

10. The satellite as claimed in claim 1, wherein the satellite comprises at least one internal panel parallel to the east and west panels, bearing a power electronic equipment on at least one face.

11. The satellite as claimed in claim 10, wherein said at least one internal panel bears the power electronic equipment on two faces.

12. The satellite as claimed in claim 1, wherein the satellite comprises at least one heat transfer device with heat pipes or fluid loops whose condensers are disposed on at least one of the north and south panels.

13. The satellite as claimed in claim 12, wherein at least one of the north and south panels is articulated around one of its edges in common with the east and west panels, the fluid loops or the heat pipes comprises flexible zones in a vicinity of said articulation.

14. The satellite as claimed in claim 1, wherein at least one of the north or south panels is composed of two half-panels, each articulated about their edge in common with the east or west panel.

15. The satellite as claimed in claim 1, wherein the satellite comprises deployable radiative panels linked by heat transfer devices to the dissipative equipment installed on the east and west panels.

16. An integration method for a telecommunications satellite stabilized on three axes, the satellite comprises a set of dissipative equipment constituting a satellite payload, the satellite is substantially parallelepipedal in form with east and west panels forming two opposing faces, the satellite comprises supporting data transmission antennas, and north and south panels forming two other opposing faces, the north and south panels comprising, on their outer faces, radiator surfaces configured to cool an electronic equipment of the satellite, the method comprises the steps of using the dissipative equipment installed on the north and south panels to dissipate a thermal power corresponding to less than 25% of a total dissipated power of the electronic equipment of the payload; and opening one of the north or south panels to access the satellite payload.

* * * * *